(12) United States Patent
Revel-Muroz et al.

(10) Patent No.: US 10,668,550 B2
(45) Date of Patent: Jun. 2, 2020

(54) METHOD FOR WELDING PIPELINES FROM HIGH-STRENGTH PIPES WITH CONTROLLABLE HEAT INPUT

(71) Applicants: Public Joint Stock Company "Transneft", Moscow (RU); Joint-stock company "Transneft Siberia", Tyumen (RU); L.L.C. "Transneft Research and Development Institute for Oil and Oil Products Transportation", Moscow (RU)

(72) Inventors: Pavel Aleksandrovich Revel-Muroz, Moscow (RU); Alexander Nikolaevich Chentsov, Moscow (RU); Oleg Igorevich Kolesnikov, Odintsovo (RU); Nikolay Georgievich Goncharov, Podolsky (RU); Mikhail Yurevich Zotov, Lytkarino (RU); Pavel Ivanovich Shoter, Moscow (RU)

(73) Assignees: Public Joint Stock Company "Transneft", Moscow (RU); Joint-Stock Company "Transneft Siberia", Tyumen (RU); L.L.C. Transneft Research and Development Institute for Oil and Oil Products Transportation, Moscow (RU)

( * ) Notice: Subject to any disclaimer, the term of this patent is extended or adjusted under 35 U.S.C. 154(b) by 674 days.

(21) Appl. No.: 15/227,963

(22) Filed: Aug. 4, 2016

(65) Prior Publication Data
US 2016/0375518 A1 Dec. 29, 2016

Related U.S. Application Data

(63) Continuation of application No. PCT/RU2014/000219, filed on Mar. 28, 2014.

(51) Int. Cl.
*B23K 9/028* (2006.01)
*B23K 9/02* (2006.01)
(Continued)

(52) U.S. Cl.
CPC .......... *B23K 9/0282* (2013.01); *B23K 9/0216* (2013.01); *B23K 9/235* (2013.01); *B23K 2101/10* (2018.08)

(58) Field of Classification Search
CPC .... B23K 9/0282; B23K 9/235; B23K 9/0216; B23K 2101/10
(Continued)

(56) References Cited

U.S. PATENT DOCUMENTS 2,819,517 A * 1/1958 Pursell ................. B23K 33/004
219/137 R
3,849,871 A * 11/1974 Kaunitz ............... B23K 9/0282
228/169

(Continued)

FOREIGN PATENT DOCUMENTS

CN 203948813 11/2014
RU 2063855 7/1996
(Continued)

OTHER PUBLICATIONS

Macia, M. L. et al.; "*Evaluation of Hydrogen Cracking Susceptibility in X120 Girth Welds*"; 2004 International Pipeline Conference, vols. 1, 2 and 3, Oct. 4-8, 2004; (2 pages).
(Continued)

*Primary Examiner* — Tu B Hoang
*Assistant Examiner* — Vy T Nguyen
(74) *Attorney, Agent, or Firm* — One LLP; Jonathan Jaech

(57) ABSTRACT

The invention relates to the field of construction, particularly to welding of above- and underground high-strength pipe-
(Continued)

lines with controlled heat input. Application of the invention will increase the load-bearing capacity of the pipelines made with the use of butt-welded pipes, pipe spools, pipe strings. The method includes joining of two or more cylindrical metal pipes, pipe spools and pipe strings by the welded ring butt with the use of the arc welding for the whole perimeter of the pipe. Criteria for a high-quality welded joint include optimal selection of parameters of the welding thermic cycle. The suggested welding method allows to have the optimal structure, high strength and viscoplastic properties in areas of the welded joint, to provide for the required load-bearing capacity of the pipeline and its reliability during operation.

12 Claims, 2 Drawing Sheets

(51) Int. Cl.
*B23K 9/235* (2006.01)
*B23K 101/10* (2006.01)

(58) Field of Classification Search
USPC .... 219/137 R, 162, 60 R, 61, 61.2; 428/576, 428/685, 684, 638, 656; 148/24, 26
See application file for complete search history.

(56) References Cited

U.S. PATENT DOCUMENTS

| | | | |
|---|---|---|---|
| 4,186,864 A * | 2/1980 | Ishimaru | B23K 33/004 219/137 R |
| 6,375,895 B1 | 4/2002 | Daemen | |
| 7,540,402 B2 | 6/2009 | McCrink et al. | |
| 8,124,247 B2 | 2/2012 | Hayakawa et al. | |
| 8,653,400 B2 | 2/2014 | Tsuru et al. | |
| 8,715,430 B2 | 5/2014 | Hara et al. | |
| 2002/0134452 A1 | 9/2002 | Fairchild et al. | |
| 2010/0006545 A1 * | 1/2010 | MacIa | B23K 9/04 219/74 |
| 2013/0094900 A1 * | 4/2013 | Folkmann | B23K 9/173 403/343 |
| 2013/0248493 A1 * | 9/2013 | Helmrich | B23K 9/0052 219/61 |
| 2013/0292362 A1 | 11/2013 | Fairchild et al. | |
| 2018/0117718 A1 * | 5/2018 | Rajagopalan | B23K 37/0531 |

FOREIGN PATENT DOCUMENTS

| | | |
|---|---|---|
| RU | 2089363 | 9/1997 |
| RU | 2098247 | 12/1997 |
| RU | 2155655 | 9/2000 |
| RU | 2187091 | 2/2002 |
| RU | 2193478 | 6/2002 |
| RU | 2229968 | 6/2004 |
| RU | 2262424 | 10/2005 |
| RU | 2268809 | 1/2006 |
| RU | 2308339 | 7/2007 |
| RU | 2119416 | 9/2008 |
| RU | 2425737 | 8/2011 |

OTHER PUBLICATIONS

Felber, F.; "*Welding of the High Grade Pipeline-Steel X80 and Description of Different Pipeline-Projects*"; Welding in the World, vol. 52, Issue 5, pp. 19-41, May 2008; (4 pages).
Kalwa, Dr.-Ing. Christoph et al. (EUROPIPE); "*High Strength Steel Pipes: New Developments and Applications*"; Onshore Pipeline Conference, Jun. 10-11, 2002; (12 pages).
Goodall, Graeme Robertson; "*Welding High Strength Modern Line Pipe Steel*"; Department of Mining and Materials Engineering, McGill University, 2011; (213 pages).

* cited by examiner

METHOD FOR WELDING PIPELINES FROM HIGH-STRENGTH PIPES WITH CONTROLLABLE HEAT INPUT

CROSS-REFERENCE TO RELATED APPLICATION

This application claims the benefit and priority of PCT Pat. App. No. PCT/RU2014/000219, titled METHOD FOR WELDING PIPELINES FROM HIGH-STRENGTH PIPES WITH CONTROLLABLE HEAT INPUT filed on Mar. 28, 2014, also published as WO/2015/147684.

FIELD

The present disclosure relates to the field of construction, particularly to welding of above- and underground pipelines an ultimate tensile strength in the range of 590-690 MPa.

BACKGROUND

Procedures of pipeline construction include methods of electric arc welding such as manual metal arc welding, semi-automatic welding by the flux cored wire, automatic submerged-arc welding or gas-shielded welding by the full wire.

Butt welding methods may include several runs with the help of beads. At this, each pass is made in a single run. Starting from the $3^{rd}$ run each pass is made in two or more runs via individual pass. The number of passes is unlimited and depends on the thickness of welded elements (e.g., pipes to be welded). A drawback of this method is that welding of each pass in a single run leads to significant deformations, both welding and post-welding ones. It leads to hot (polygonizational) and cold cracks. Cracks are caused by the fact that the previous pass is cooled down before the next pass is made. Stresses during cooling of the non-uniformly heated metal are concentrated in the weld metal that leads to the loss of plasticity and crack formation.

During high-strength steel welding, mechanical features mostly depend on the value of heat input to the metal or the welding energy. In particular, the high heat input decreases strength properties of welded joints. To provide adequate mechanical features in weld areas, it is necessary to limit the maximum heat input value. The harder this limit is, the stricter requirements to the certain steel are. So, during development of welding technologies for high-strength steels, the main criteria for the high-quality welded joint is the optimal selection of parameters for the thermal welding cycle.

Reasons that prevent obtaining of the technical result that is provided by the method disclosed herein include an absence of requirements for the selection of parameters of the thermal welding cycle. Some known methods allow monitoring of the welding parameters. For example, method for pipe welding by the arc-welding current may include a controlled wave shape of welding cycles with short circuits. As a result, the high quality of the seam is provided (patent RU No. 2193478, published on Jun. 10, 2002, IPC B23K31/02). A drawback of this method is that the high-quality seam may be obtained only for the root pass and the metallurgical quality of metal remains at the same level for filling passes. This method helps to obtain the high-quality root penetration or to obtain the reverse mould in the root pass, i.e. geometrical parameters of the seam are high but this method has no effect on mechanical features of the weld metal.

There exists a method to determine the allowed modes for arc welding of austenitic steels and alloys via evaluation of the metal's propensity for inter-crystalline corrosion cracking. The method consists of the preliminary bead welding at different welding heat input on solid or composite plates with the certain correlation to the rate of welded joint cooling. Bead welding may be done by the electric arc, the heat input of which is 30-50% higher than the calculated one. This invention is aimed to increase the quality of welded joints of the equipment and pipelines made of austenitic steels and alloys (patent RU No. 2187091 published on Oct. 2, 2002, IPC G01N17/00). A drawback of such welding method is that welding modes allowed for austenitic steels are not allowed for welding of ferrous metal elements.

Another method is used for welding of cast iron products. The method pertains, in particular, to the arc welding of cast iron products with spherical graphite and can be used for welding of products made of the tubing stock in the oil and gas industry, energy industry, ship building and the communal service. Products are welded by the electric arc welding by the non-consumable electrode with the use of the filling wire that contains 55-95% of nickel. After the last filling pass is welded on both sides of weld, they weld technological bead with the width that is higher than thickness of welded products and the welding depth of no less than 0.35 of this thickness, at this technological beads and the last filling pass form the cap weld. This method provides for the higher strength of the welded joint, because stress raisers are excluded from the area of the weld's temperature effect due to technological beads (Patent RU No. 2098247, published on Dec. 10, 1997, IPC B23K9/23).

However, this method is allowed only for cast iron welding. Welding materials that contain 55-95% of nickel cannot be used for welding of low-carbon and low-alloyed construction steels because high-strength structures of the martensitic class prone to crack formation are formed on the weld line. In this case, it is impossible to obtain the full-strength welded joint.

Another method uses electric arc welding with a consumable electrode and pulse-type current modulation. Welding is made by the modulated current, where regulation of the pulse lengths and pauses in the welding current is made separately and independently. Additional pulses are applied with the range equal to the range of main pulses and the currency of no less than 50 Hz and the duration within 0.5-2 ms on the small welding current of 5-30 A during the pause interval. The heating power of the welding arc is controlled automatically at will of a welder by the change of parameters of main pulses in the function of average voltage fluctuation from the preset one by the small change of the 2 . . . 2.5 V arc space length. The technical result of the invention is the decreased radiation contrast of the arc in the pulse and the pause, the increased quality of the welded joint, the opportunity to manage the heat power of the arc upon the welder's wish, the increased mapping of the seam (Patent RU No. 2268809, published on Jan. 27, 2006, IPC B23K9/095). A drawback of this method is the absence of any requirements to welding of certain steels. The invention only gives methodical approaches to management of the welding arc power.

Another method for electric arc welding by a consumable electrode can be used for the pipeline welding. A flat isolated electrode is fixed with the output in the joint between welded pipes. The electrode is made as a part of the ring with the medium radius equal to the radius of welded pipes. Its width is equal to thickness of pipe walls. The electrode is bypassed by the highly conducting bus line through easily fusible tie plates. The electric arc is driven between the electrode and welded pipes. They set up the current and voltage values on the current source according to the required power determined upon the formula. They fuse the mandrel and butts of pipes. The power value is determined upon the formula depending on the needed value of the metal vapors gage pressure. The electric arc is automatically and spontaneously moved along the butt of the mandrel. The fused metal of the weld is cooled down. Parts of the joint that remain unwelded are to be welded by the consumable stick electrode. The electric welding device contains the flat consumable isolated electrode with the output. The invention allows to simplify the pipe welding process and to increase its quality (Patent RU No. 2119416 published on Aug. 27, 1998, IPC B23K9/14). However, this welding method is labor-intensive and the quality of the weld is unstable regarding to both mechanical features and the defect structure of the seam metal along its section.

Another method uses automatic argon-arc impulse for welding of steel pipes by a non-consumable electrode. At first, the pipe butts are opened up with formation of ring bevels on internal surfaces of butts and then the pipes are joined. The welded edges are moved along the electrode by the stepwise axis rotation of joined pipes with the rate of 1-1.5 rpm. About 2-5 s before starting rotation of pipes the arc is struck to heat the weld area. Welding is done by the torch installed downward at an angle of 60-85 grades to the vertical of the pipe axis. The arc current load is supported within the range of 110-155 A with an impulse duration of 0.7-0.9 s. The current in the pause is supported within the range of 10-30 A with the duration of 0.5-0.7 s. Stripping of the seam is supported with the range of 10-25 mm. That will allow to avoid crack formation in the pipe weld with coupon bending for the angle of more than 160 grades (patent RU No. 2262424 published on Oct. 20, 2005, IPC B23K9/167). However, the non-consumable electrode welding method is effective for welding of the seam's root run, thin-walled elements (with wall thickness of up to 4 mm) and especially of non-ferrous metals. It is virtually impossible to obtain the high-quality welded joint from the elements with the high wall thickness upon the strength uniformity criterion. Moreover, the use of this method increases the labor intensity of the process.

Another pipe butt welding method is used during manufacture of pipelines with both large and small diameters. The method includes opening up and blunting edges of welded details. The bluntness value is selected according to the steel grade, thickness of welded pipes, the heat input value during the electric arc welding and the speed of pipeline construction according to the correlation d/s<0.5, wherein 'd' is thickness of bluntness, and 's' is wall thickness of welded pipes. The root weld is made by the electric-contact welding with fusing. The remaining part of opening is made by the electric arc welding. As a result, the high speed of pipeline construction is provided, and the labor productivity during installation and welding works is increased, the number of service staff and the expense of welding materials at the high quality of the welded joint (patent RU No. 2229968, published on Jun. 10, 2004, IPC B23K31/02). However, this welding method does not allow to have high-quality welded joints upon the resilience criterion. Resilience values are much lower than the values stated by regulatory documents. Moreover, the welded joints made by the contact welding, cannot be controlled using traditional non-destructive testing methods—ultrasound and radiographic methods.

It would be desirable, therefore, to overcome the drawbacks of these methods while retaining their advantages, by developing a new method for butt welding of elements, for example pipes used to construct a pipeline.

SUMMARY

Objects of the disclosed method include obtaining a weld that is full-strength with the main metal.

The technical result that can be obtained during implementation of this method is to increase viscoplastic properties of the welded joint's metal that increases its resistance to crack formation due to the decreased level of residual welding stresses in the welded butt. In its turn, it provides the increased bearing capability of the pipeline made of butt-welded pipes and pipe spools.

This objective is attained by the presently disclosed method for welding of high-strength pipelines with controlled heat input. This method includes opening of joining pipe butts for welding, assembling of welded elements, preparation of edges in welded elements of welded joints, welding of elements by the ring butt with the use of the arc welding along the whole perimeter of the pipe and with controlled parameters of a welding thermal cycle. At that, the control of the heat input to the metal is made within the range of 0.8-1.2 kJ/mm, and the edge opening for welding is made with the ratio of cumulative thickness of edge openings to thickness of welded elements within the range of 1.3 and 2.0, the preheating is done at temperature of 170-200° C., applying of weld beads that form the butt welded joint is implemented with correlation of thickness values of the previous and the following beads that are from 1.0 to 2.0, each run that forms the weld is made by the parallel applying of two beads, and each second bead is the normalizing one and it fully overlaps the first bead; the process is made with the interpass temperature between applied beads of the weld that is from 170 to 220° C., and the weld is cooled down with the rate of 150-200° C. per hour due to coverage by heat-insulating belts that insulate the butt weld until the butt temperature reaches 50° C.

The method includes selection of welding parameters that are applicable for welding of steels with the steel grade of up to 550 MPa. During high-strength steel welding, mechanical features mostly depend on the value of heat input to the metal or the welding energy. In particular, the high heat input decreases strength properties of welded joints. To provide adequate mechanical features in weld areas, it is necessary to limit the maximum heat input value. The harder this limit is, the stricter the requirements to the certain steel. So, during development of welding technologies for high-strength steels, an important criteria for the high-quality welded joint is the optimal selection of parameters for the thermal welding cycles.

BRIEF DESCRIPTION OF THE DRAWINGS

The features, nature, and advantages of the present disclosure will become more apparent from the detailed description set forth below when taken in conjunction with the drawings.

DETAILED DESCRIPTION

The present method may be applied for pipe welding during construction of above- and underground pipelines at negative ambient temperatures, for example, temperatures below −40° C.

Main parameters that determine the heat input value during welding are: the welding current, the arc voltage and the welding rate. The formula for calculation of the heat input during the welding $$E = \frac{6 \times I \times U}{100 \times v} \quad (1)$$

where I is the welding current, A; U is the welding rate, mm/min; E=arc energy, kJ/mm.

The value of heat input to the metal is determined by the formula (2):

$$Q = k \cdot E \quad (2)$$

where Q is the heat input, kJ/mm.

The research that has been done in the Transneft R&D, LLC and affiliated companies of OJSC "JSC Transneft" as well as tests during the layout in the Extreme North districts with the air temperature of up to 50° C. below zero have shown that the full-strength welded joint for steel pipes with temporary breaking stress of 590-690 MPa, the wall thickness of 4-32 mm is obtained, the residual welding voltages and prevention of stowing structures with low crack formation strength are provided by the disclosed welding method.

Figure 1:
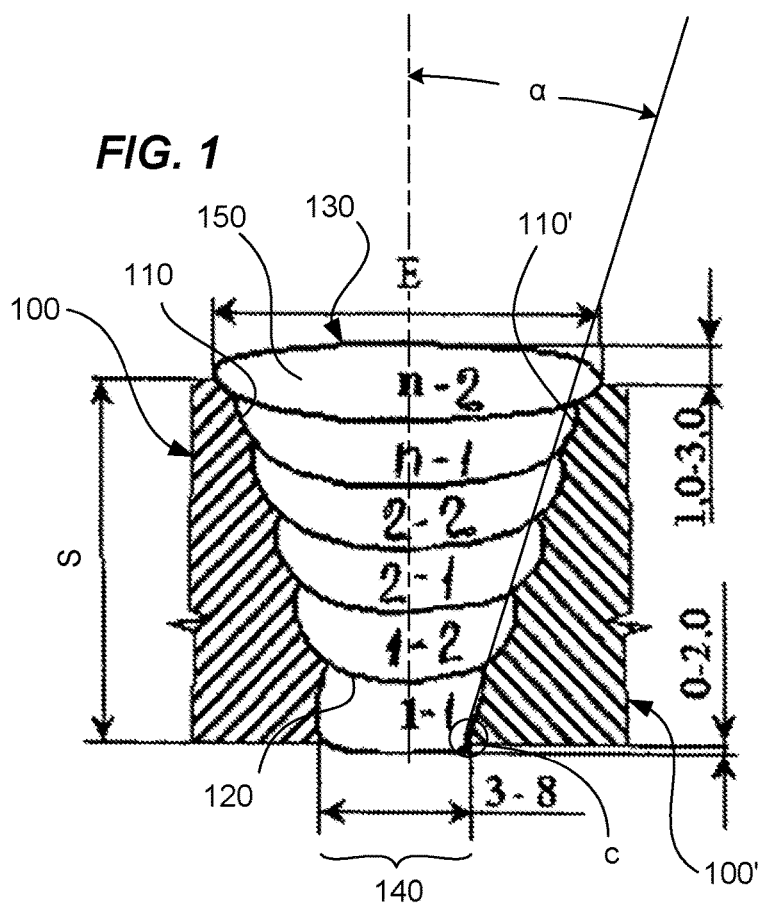
FIG. 1 shows a scheme of bead application according to the method. Beads are applied in parallel, one upon the other, and every next bead overlaps the previous one at 100%.
Figure 2:
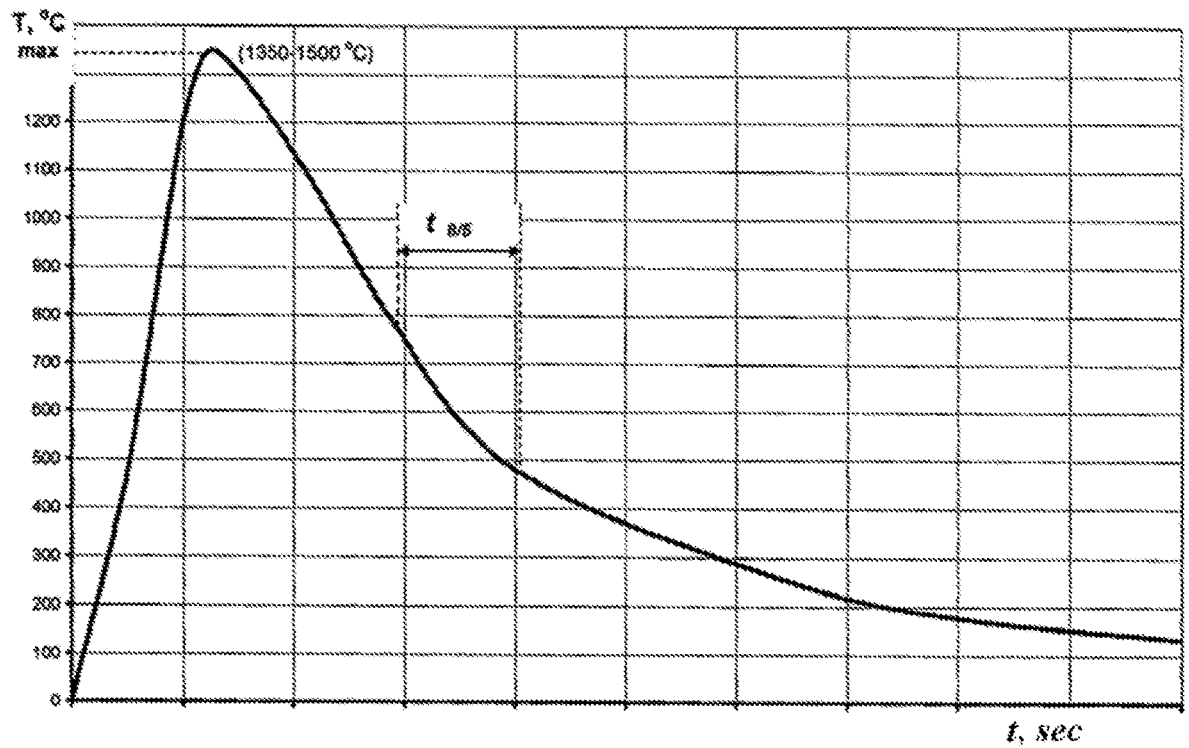
FIG. 2 is a temperature graph showing that an important microstructural changes of the fused metal and the heat-affected zone (HAZ), as for its mechanical features, happen during the cooling process within the temperature range of 800-500° C. The cooling rate is characterized by the time of the cooling process in this very temperature zone ($t_{8/5}$).
Figure 3:
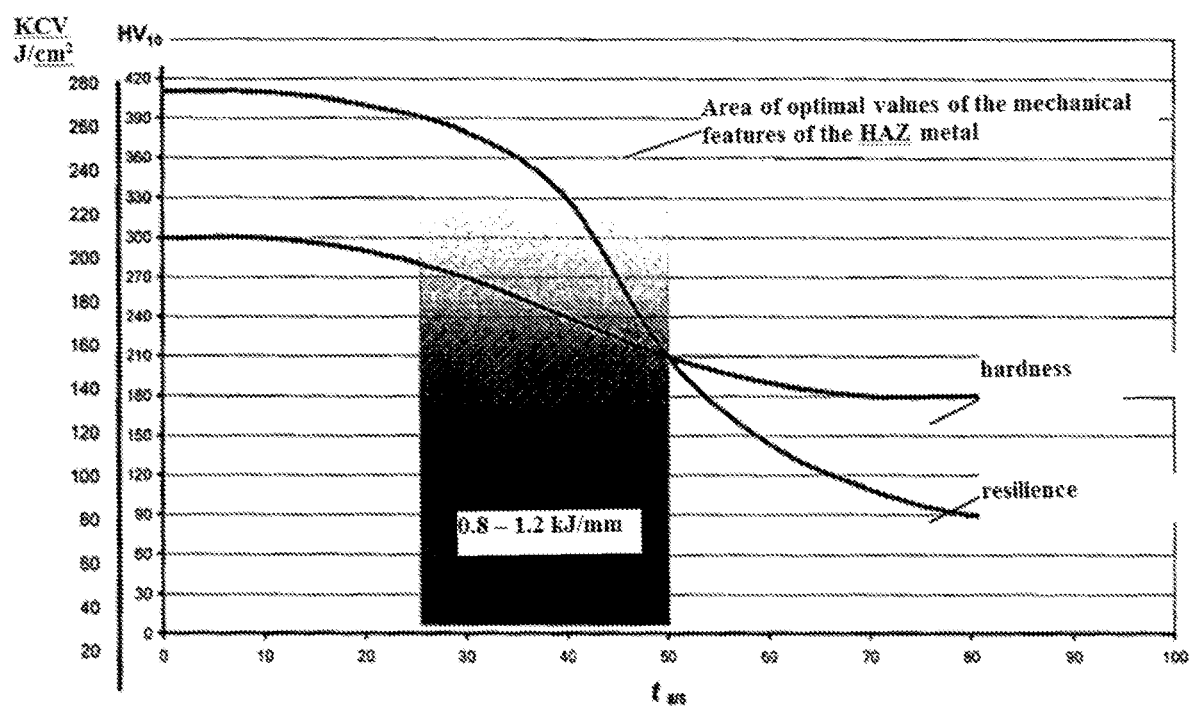
FIG. 3 is a graph showing that the high heat input and, subsequently, the longer cooling time ($t_{8/5}$) decrease both hardness characteristics (thus, strength indices) and resilience. At that, resilience is more sensitive to the increased heat input value. Optimal values of hardness and resilience correspond to the optimal heat input within the range of 0.8-1.2 kJ/mm.

The method may be implemented as follows. Referring to FIG. 1, butted ends 110, 110' of the pipes 100, 100' or elements to be welded are opened up for the welding, such that a ratio of the cumulative width of end openings 'E' to thickness of welded elements 'S' is within the range of 1.3-2.0 and the gap 140 between the butted ends 110, 110' at their closest point is in the range of 3-8 mm. Then, the ends of the pipes 100, 100' or elements to be welded are preheated within the range of 170–220° C.

Multiple beads 1-1, 1-2, 2-1, 2-2 . . . n-1, n-2 are laid down between the ends of the pipes 100, 100' or elements to be welded, where a ratio of thickness values of each previous and each next bead is selected within the range of 1.0-2.0.

The inter-layer 120 temperature control between applied beads 1-1, 1-2, 2-1, 2-2 . . . n-1, n-2 is controlled within the range of 170–220° C. Application of a heat-insulating belt (not shown) around the completed welded joint may be used to control cooling of the welded joint with the rate of 150-200° C. per hour until cooled to the temperature of 50° C. Application of the weld beads 130 that form the weld may be with 100% overlapping, as shown in FIG. 1. Welding of butt welds are done by application of not less than 5 main and 5 normalizing beads, at this every subsequent bead 100% overlaps the previous one.

Experiments have shown that:

if the correlation of cumulative width of the gap 'E' between the abutted ends 110, 110' to thickness 'S' of welded elements exceeds 2.0 in upper weld pass 150, polygonizational cracks appear and decrease strength properties of the welded joint and, accordingly, parameters of its reliability and workability;

if the correlation of cumulative width of the qap 'E' between the butted ends 110, 110' to thickness of welded elements 'S' is less than 1.3, welds acquire a negative columnar structure, and the level of residual welded stresses increases in the welded joint that decreases its strength properties and, accordingly, parameters of its reliability and workability;

compliance with the said parameters of preheating, interlayer temperature control, correlation between thickness values of the previous and the next beads allow to control parameters of the heat input to the metal within the required range, application of a heat-insulating belt allows to control the process of butt weld cooling and to prevent formation of stowing structures with low crack resilience at temperatures below 300° C. and decreased mechanical features of the metal within the area of thermic effect of the welded joint;

a tempering bead run with 100% overlapping provides heat treatment of the previous bead and to stabilize mechanical features of the weld upon thickness of the pipe wall.

Welding is made by electrodes with strength characteristics equal to the welded metal or exceeding them by no more than at 30%.

To determine workability of the construction and its optimal characteristics, the full-scale test works under industrial conditions have been carried out at temperatures of up to minus 50° C. inclusive. Stock that is 36 m long, made out pipes with 1,020 mm diameter, with a wall thickness of 10 mm, out of the pipe of steel grade K65 was welded in the aboveground version on demountable supports. The non-destructive control has shown absence of any defects of the welding origin, as well as of any mechanical damages and cracks.

As a result, parameters of the welding technology listed in Table 1 have been determined.

TABLE 1

| Parameter | Designation | Numeric values of parameters |
|---|---|---|
| Temporary breaking stress for the pipe metal (main metal), MPa | Ò in Ohms | 640 |
| Temporary breaking stress for the metal of the weld, MPa | Ò in msh | 680 |
| Parameters of edge opening: | | |
| skew angle, grade | a | 25-30 |
| bluntness | c | 1.8 ± 0.8 |
| Degree of the main bead's overlapping by the normalizing one, % | N | 100 |
| Range of thickness values of welded elements, mm | S | 4-32 |
| Minimal number of the applied main and normalizing beads | n | 5 |
| Inter-layer temperature range, ° C. | T | 170-220 |
| Maximum rate of post-welding butt cooling, ° C./hour | V | 200 |
| Ambient air temperature during welding | T | Minus 40, up to |
| Minimal temperature at which the butt can be cooled down at the air without any protective coverage | T | 50 |

The experimental research has shown that full-strength welded joints for steel pipes with a temporary breaking stress of 590-690 MPa can be achieved, with a wall thickness of 4-32 mm. Residual welding stress relief and prevention of quenching cracks are provided due to the controlled heat input to the metal, within the range of 0.8-1.2 kJ/mm, by application of the end opening for welding with a ratio of the cumulative width of end opening 'E' to thickness of welded elements 'S' within the range of 1.3-2.0, preheating of the elements to be welded to within a range of 170-200° C., the multi-layer ring butt welded joint of tube stocks with a ratio of thickness values of each previous and next bead within a range of 1.0-2; maintaining inter-layer temperature control between applied beads of the weld within a range of 170-220° C., application of a heat-insulated belt (not shown) to control cooling of the welded joint within a rate of 150-200° C. per hour until cooled to the temperature of 50° C., and application of the welded beads that form the weld with 100% overlapping.

Suggested modes give the opportunity to remove residual welding stresses and to prevent formation of the quenching structures with the low resilience to formation of cracks that appear during cooling of the butt weld.

Application of the suggested method provides for a full-strength weld with a high metallurgical quality and high viscoplastic properties, that increases the weld's resilience to crack formation and increases the load bearing capacity of the pipeline.

The invention claimed is:

1. A method for butt welding of pipes at negative ambient temperatures, comprising:
    arranging butted ends of pipes to be welded to form a gap of 3-8 mm between the butted ends at their closest point, the gap tapered outward;
    preheating the butted ends of the pipes to be welded to a temperature in a range of 170-220° C., prior to arc welding;
    arc welding the pipes together around a perimeter thereof forming a butt welded joint comprised of overlapping rings of weld beads, wherein successive ones of the weld beads that form the butt welded joint are configured such that thickness of each previous bead is maintained in a ratio to thickness of each subsequent bead within a range of 1 to 2;
    during the arc welding, controlling heat input to the metal in the range of 0.8-1.2 kJ/mm;
    maintaining an inter-layer temperature between applied weld beads of the butt welded joint within a range 170-220° C. during the arc welding; and controlling cooling of the butt welded joint at a rate within a range of 150-200° C. per hour until cooled to 50° C.

2. The method of claim 1, wherein the arranging the butted ends of the pipes to be welded comprises maintaining a ratio of the width of the gap to thickness of the pipes to be welded within a range of 1.3 to 2.0.

3. The method of claim 1, wherein each run around the perimeter of the arc welding includes parallel application of a bead pair wherein each second bead is for normalizing temperature of each first bead and fully overlaps the each first bead.

4. The method of claim 1, wherein a number of beads making up the butt welded joint is not less than five.

5. The method of claim 1, wherein controlling the cooling is performed using a heat-insulated belt around the butt welded joint.

6. The method of claim 1, wherein the arranging the butted ends of the pipes to be welded comprises configuring each of the tapered walls according to a skew angle in a range of 25 to 30 degrees.

7. The method of claim 1, wherein the arranging the butted ends of the pipes to be welded comprises configuring each of the ends of the pipes to be welded with a bluntness of 1.8±0.8 mm.

8. The method of claim 1, wherein an ambient air temperature during the arc welding is below −40° C.

9. The method of claim 1, wherein a wall thickness of the pipes to be welded is in a range of 4 to 32 mm.

10. The method of claim 1, wherein a breaking stress of the pipes to be welded is less than a breaking stress of the butt welded joint.

11. The method of claim 1, wherein the gap is configured with tapered walls opening to an increasing width outwardly.

12. The method of claim 1, wherein a breaking stress of the pipes to be welded is 640 MPa, and a breaking stress of the butt welded joint after performance of the method is 680 MPa.

* * * * *